(12) United States Patent
Morita (10) Patent No.: US 6,172,713 B1
(45) Date of Patent: Jan. 9, 2001

(54) COLOR TELEVISION SYSTEM DETERMINATION CIRCUIT

(75) Inventor: Hisao Morita, Hirakata (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 08/988,027

(22) Filed: Dec. 10, 1997

(30) Foreign Application Priority Data

Dec. 12, 1996 (JP) ............................... 8-331776

(51) Int. Cl.$^7$ ............................ H04N 5/38; H04N 15/00; H04N 5/04; H04N 9/66
(52) U.S. Cl. ........................... 348/557; 348/21; 348/41; 348/454; 348/457; 348/500; 348/505; 348/506; 348/507; 348/508; 348/554; 348/555; 348/557; 348/558; 348/638; 348/640; 348/641; 348/912; 386/1; 386/9; 386/10
(58) Field of Search ................. 348/21, 41, 454, 348/457, 500, 505, 506, 507, 508, 554, 555, 557, 558, 638, 640, 641, 912; 386/1, 9, 10

(56) References Cited

U.S. PATENT DOCUMENTS

| | | | | |
|---|---|---|---|---|
| 3,679,816 | * | 7/1972 | Avins .............................. | 178/5.4 HE |
| 3,839,649 | | 10/1974 | Morio ............................... | 307/233 A |
| 4,024,571 | * | 5/1977 | Dischert et al. ..................... | 358/4 |
| 4,404,583 | * | 9/1983 | Tatami ............................... | 358/13 |
| 4,546,377 | * | 10/1985 | Kasagi et al. ..................... | 386/23 |
| 4,660,073 | * | 4/1987 | Baumeister ......................... | 358/21 |
| 4,688,082 | * | 8/1987 | Kato .................................. | 358/21 |
| 4,821,112 | * | 4/1989 | Sakamoto et al. ................. | 358/17 |
| 4,860,089 | * | 8/1989 | Smith ................................ | 358/10 |
| 4,933,749 | * | 6/1990 | Van Lammerman et al. ..... | 358/23 |
| 4,970,581 | * | 11/1990 | O'Gwynn .......................... | 358/17 |
| 4,975,767 | * | 12/1990 | Sorenson .......................... | 358/19 |
| 5,012,327 | * | 4/1991 | Bishop .............................. | 358/17 |
| 5,136,369 | * | 8/1992 | Bohme et al. ..................... | 358/11 |
| 5,155,582 | * | 10/1992 | Tokoi et al. ....................... | 358/31 |
| 5,216,496 | * | 6/1993 | Miyamoto et al. ................ | 358/41 |
| 5,386,244 | * | 1/1995 | Gai .................................... | 348/610 |
| 5,426,470 | * | 6/1995 | Kita et al. .......................... | 348/668 |
| 5,663,768 | * | 9/1997 | Yang ................................. | 348/557 |
| 5,786,865 | * | 7/1998 | Ayzenberg et al. ............... | 348/505 |
| 5,801,789 | * | 9/1998 | Zeidler .............................. | 348/589 |
| 5,831,680 | * | 11/1998 | Azuma et al. ..................... | 348/506 |
| 5,835,157 | * | 11/1998 | Miyazaki et al. .................. | 348/558 |
| 5,905,538 | * | 5/1999 | Shuholm et al. .................. | 348/555 |
| 5,926,602 | * | 6/1999 | Okura ................................ | 386/13 |
| 5,953,072 | * | 9/1999 | Lim ................................... | 348/555 |
| 6,038,276 | * | 3/2000 | Dinh .................................. | 375/376 |

FOREIGN PATENT DOCUMENTS

| | | | |
|---|---|---|---|
| 358025789 | * | 2/1983 | (JP) . |
| 58-025789 | | 2/1983 | (JP) . |
| 358141092 | * | 8/1983 | (JP) . |
| 363131680 | * | 6/1998 | (JP) . |

* cited by examiner

Primary Examiner—John K. Peng
Assistant Examiner—Brian P. Yenke
(74) Attorney, Agent, or Firm—Ratner & Prestia (57) ABSTRACT

A color system determination circuit for use with an input video signal having a frequency component is disclosed. The circuit includes a color trap filter for attenuating the frequency component in the input video signal with the color trap filter providing a color burst output signal, a comparator for comparing the color burst output signal of the color trap filter and the frequency component of the input video signal, a maximum value detector which receives the color burst output signal of the color trap filter and a color burst sampling signal and detects a maximum value of the color burst output signal of the color trap filter during a period of the color burst sampling signal, and another maximum value detector which receives the video signal and the color burst sampling signal and detects a maximum value of the video signal during the period of the color burst sampling signal. The comparator receives output signals of the maximum value detector and the other maximum value detector, compares both signals, and outputs a comparison result.

27 Claims, 8 Drawing Sheets

COLOR TELEVISION SYSTEM DETERMINATION CIRCUIT

FIELD OF THE INVENTION

The present invention relates to the field of color television broadcasting system determination circuits (hereafter referred to as the "color system determination circuit") in color television receivers.

BACKGROUND OF THE INVENTION

Television receivers for multiple color television broadcasting systems including PAL and NTSC incorporate a color system determination circuit for automatically determining the type of color television broadcast signal received.

The Japanese Laid-open Patent No. S63-131680 discloses one such type of color system determination circuit.

The color system determination circuit of the prior art employs two clock oscillators for determining color systems. Specifically, this color system determination circuit has two clock oscillators for producing two different color subcarrier frequencies. These two clock oscillators are switched for oscillation, and the broadcasting system of the television input signal is checked and determined based on these oscillation signals. The prior art may require a certain period of time for making a determination.

SUMMARY OF THE INVENTION

A color system determination circuit of the present invention comprises a color trap filter for attenuating a frequency component of the input video signal, and a comparator for comparing the color burst signal in the output of the color trap filter and the frequency component of the input video signal. The frequency component is preferably a color subcarrier component. In other words, the present invention employs the color trap filter for attenuating the color subcarrier component of one type of color broadcast signal in probable color television broadcast signals to be received. The color system of the input signal is determined by comparing the color burst signal of the input signal and the color burst signal output from the color trap filter.

The present invention can therefore offer a high-speed color system determination circuit which shortens the time required for determining color systems.

DESCRIPTION OF THE PREFERRED EMBODIMENTS

First exemplary embodiment

A first exemplary embodiment of the present invention is explained with reference to FIGS. 1 and 2.

A color system determination circuit in the first exemplary embodiment of the present invention comprises a color trap filter 10, a first maximum value detector 11, a second maximum value detector 12, a differentiator 13, a comparator 14, and a flip-flop 15.

Figure 1:
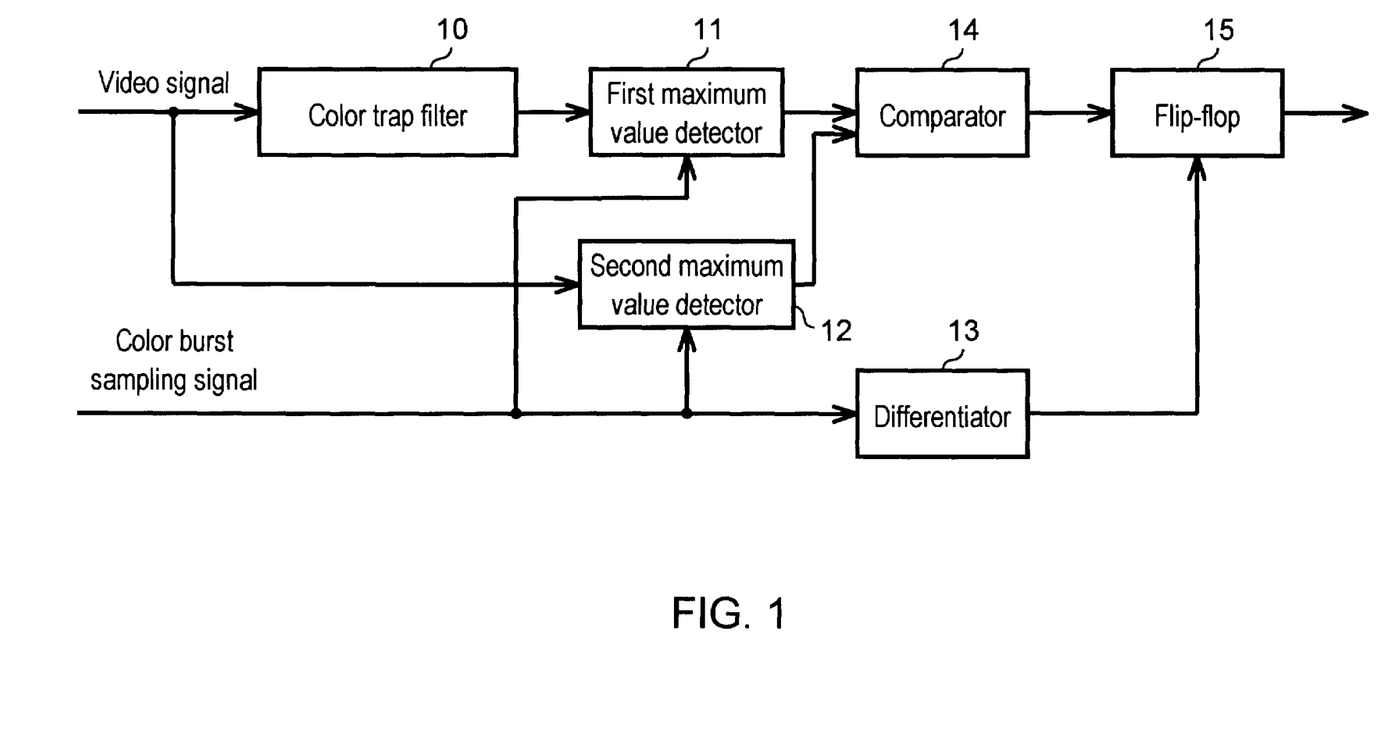
FIG. 1 is a block diagram of a color system determination circuit in accordance with a first exemplary embodiment of the present invention.

In FIG. 1, a video signal is input to the color trap filter 10 and the second maximum value detector 12. A color burst sampling signal is input to the first maximum value detector 11, the second maximum value detector 12, and the differentiator 13.

The color burst sampling signal is used for separating a color burst signal from the video signal, and circuits to which this signal is applied are activated during the time period of the color burst signal. Only the color burst signal of the video signal is transmitted while these circuits are activated.

Figure 2:
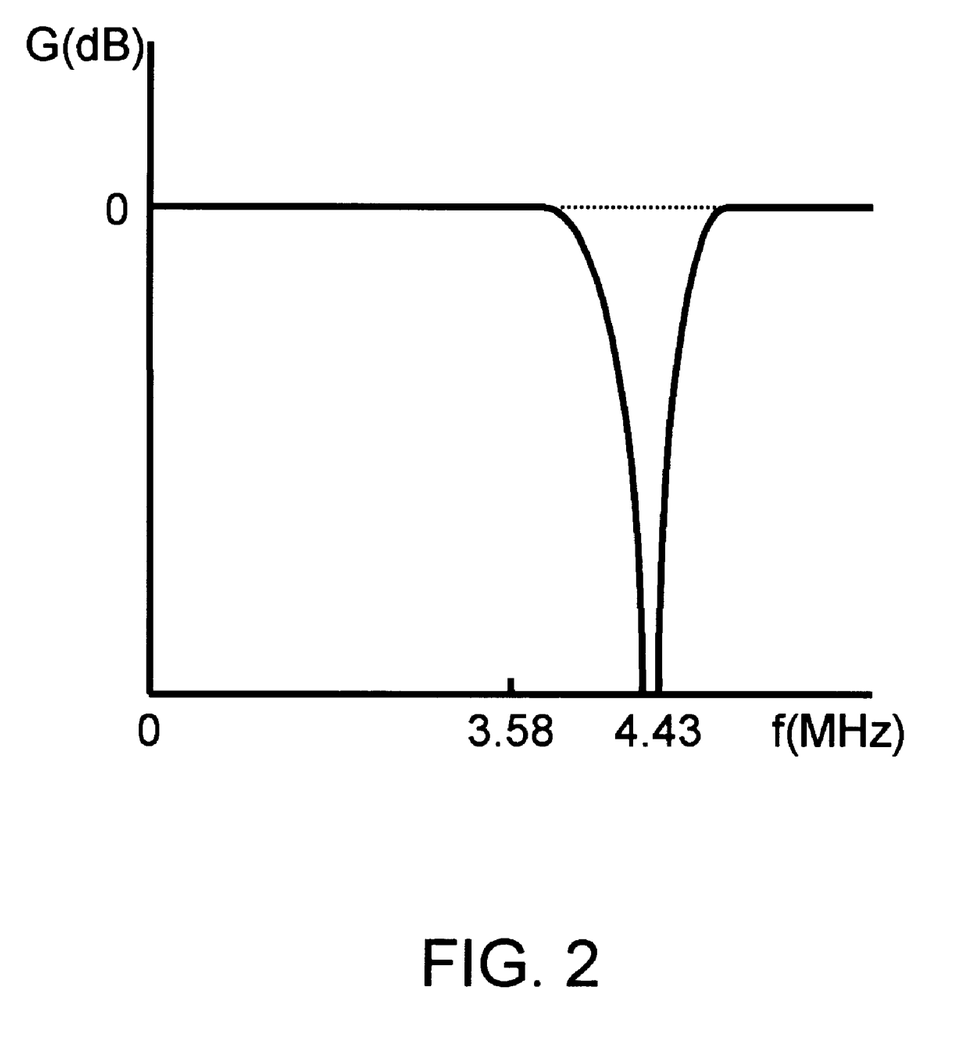
FIG. 2 is a graph showing the characteristics of a color trap filter in accordance with the first to fourth exemplary embodiments of the present invention.

The color trap filter 10 is a filter for immediately trapping a subcarrier frequency of one broadcasting system to be received (in FIG. 2, 4.43 MHz which is the PAL subcarrier frequency). The characteristics of color trap filter 10 are shown in FIG. 2 which shows the relationship between frequency f and output amplitude gain G. The first maximum value detector 11 receives the output signal of the color trap filter 10 and the color burst sampling signal, and detects the maximum value of the output signal of the color trap filter 10 during the period indicated by the color burst sampling signal. In other words, the first maximum value detector 11 detects the maximum value of the color burst signal which has passed through the color trap filter 10.

The second maximum value detector 12 receives the video signal and the color burst sampling signal, and detects the maximum value of the subcarrier burst signal of the input video signal during a period indicated by the color burst sampling signal.

The differentiator 13 receives the color burst sampling signal, detects the edge which indicates the end of the color burst sampling signal, and outputs the edge signal.

The comparator circuit 14 receives the output signals of the first maximum value detector 11 and the second maximum value detector 12, compares the size of both signals, and outputs a comparison result.

The flip-flop 15 receives the output signal of the comparator 14 and the edge signal, and stores the output of the comparator 14 using the edge signal as a trigger.

The color trap filter 10 in FIG. 2 has the characteristics of not changing the amplitude of the NTSC subcarrier frequency, i.e. 3.58 MHz, but significantly attenuates the PAL subcarrier frequency, i.e., 4.43 MHz.

If the PAL video signal is input, the amplitude of the color burst signal in the output signal of the color trap filter 10 is significantly attenuated. Accordingly, there will be a large difference in the amplitude of the input color burst signal and the color burst signal output from the color trap filter 10. Thus, the difference between the outputs of the first maximum value detector 11 and the second maximum value detector 12 during the color burst period indicated by the color burst sampling signal thus becomes large. In other words, the output signal of the second maximum value detector 12 becomes larger, and the comparator 14 outputs a comparison result indicating a PAL system signal, for example HI. The flip-flop 15 is triggered by the edge signal which indicates the end of the color burst period, to sustain the above comparison result and outputs the above comparison result, which is a color system determination result.

If the NTSC video signal is input, the amplitude of the color burst signal output from the color trap filter 10 is not attenuated. Accordingly, there is no difference in the amplitudes of the input color burst signal and the color burst signal output from the color trap filter 10. Therefore, the outputs of the first maximum value detector 11 and the second maximum value detector 12 during the color burst period, indicated by the color burst sampling signal, are essentially equivalent, and the comparator 14 outputs a comparison result indicating an NTSC system signal, for example LOW.

The color system determination circuit of this exemplary embodiment operates rapidly, and outputs the determination result at high speed.

Second exemplary embodiment

A second exemplary embodiment of the present invention is explained with reference to FIGS. 2 and 3.

A color system determination circuit in the second exemplary embodiment of the present invention comprises a color trap filter 30, first absolute value circuit 31, second absolute value circuit 32, first maximum value detector 33, second maximum value detector 34, differentiator 35, comparator 36, and flip-flop 37.

Figure 3:
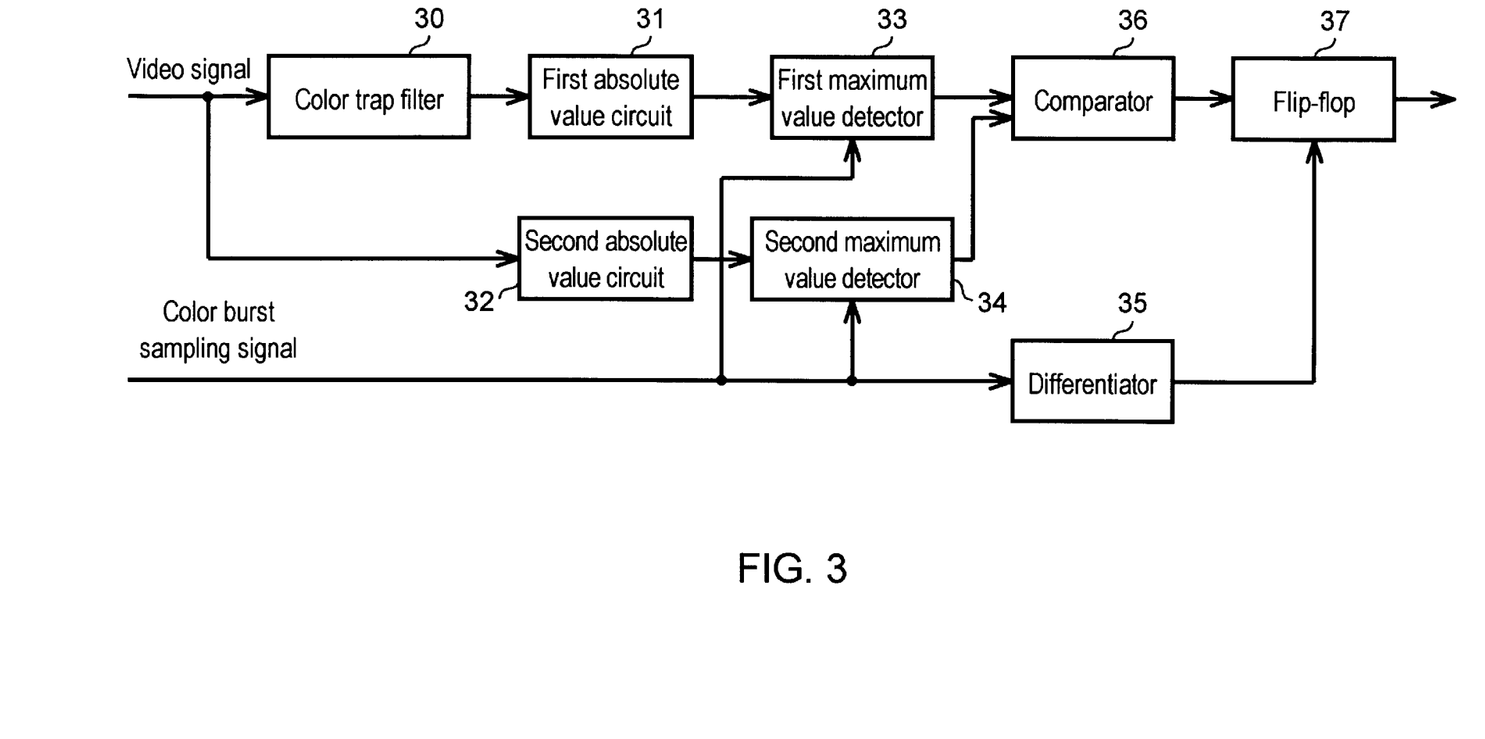
FIG. 3 is a block diagram of a color system determination circuit in accordance with a second exemplary embodiment of the present invention.

The color trap filter 30 in FIG. 3 has the characteristics shown in FIG. 2.

In FIG. 3, a video signal is input to the color trap filter 30 and the second absolute value circuit 32. A color burst sampling signal is input to the first maximum value detector 33, the second maximum value detector 34, and the differentiator 35.

The color burst sampling signal is used to separate a color burst signal from the video signal, as in the first exemplary embodiment, and the circuits to which this signal is applied are activated during the time period of the color burst signal. The color burst signal of the video signal is transmitted while these circuits are activated.

The color trap filter 30 is a filter for trapping a subcarrier frequency of one broadcasting system to be received (in FIG. 2, 4.43 MHz which is the PAL subcarrier frequency). The characteristics of color trap filter 30 are shown in FIG. 2.

The first absolute value circuit 31 receives the output signal of the color trap filter 30, and applies the absolute value processing to the output signal. The first maximum value detector 33 receives the output signal of the first absolute value circuit 31 and the color burst sampling signal which shows the position of the color burst signal, and detects the maximum value at the output signal of the first absolute value circuit during the period indicated by the color burst sampling signal. The second absolute value circuit 32 receives the video signal, and applies the absolute value processing to the video signal. The second maximum value detector 34 receives the output signal of the second absolute value circuit 32 and the color burst sampling signal which shows the position of the color burst signal, and detects the maximum value at the output signal of the second absolute value circuit 32 during a period indicated by the color burst sampling signal.

The differentiator 35 receives the color burst sampling signal, and detects the edge which shows the end of the color burst sampling signal, and outputs the edge signal. The comparator 36 receives the output signals of the first maximum value detector 33 and the second maximum value detector 34, compares both signals, and outputs a comparison result. The flip-flop 37 receives the output signal of the comparator 36 and the edge signal, and stores the output of the comparator 36 using the edge signal as a trigger.

If the PAL video signal is input, the amplitude of the color burst signal in the output of the color trap filter 30 is significantly attenuated. Accordingly, there will be a large difference in the amplitude of the input color burst signal and the color burst signal output from the color trap filter 30. Thus, the difference between the outputs of the first maximum value detector 33 and the second maximum value detector 34 during the color burst period indicated by the color burst sampling signal thus becomes large. In other words, the output of the second maximum value detector 34 increases, and the comparator 36 outputs a comparison result indicating a PAL system signal, for example HI. The flip-flop 37 is triggered by the edge signal which indicates the end of the color burst period, to sustain the above comparison result and outputs the above comparison result, which is a color system determination result.

If the NTSC video signal is input, the amplitude of the output signal from the color trap filter 30 is not attenuated. Accordingly, there is no difference in the amplitudes of the input color burst signal and the color burst signal output from the color trap filter 30. The outputs of the first absolute value circuit 31 and the second absolute value circuit 32 become essentially equivalent. Thus, the outputs of the first maximum value detector 33 and the second maximum value detector 34 during the color burst period indicated by the color burst sampling signal become essentially equivalent, and the comparator 36 outputs a comparison result indicating an NTSC system signal, for example LOW.

The color system determination circuit of this exemplary embodiment operates rapidly, and outputs the determination result at high speed.

Third exemplary embodiment

A third exemplary embodiment of the present invention is explained with reference to FIGS. 2 and 4.

A color system determination circuit in the third exemplary embodiment of the present invention comprises a color trap filter 40, first absolute value circuit 41, second absolute value circuit 42, first low-pass filter (hereafter referred to as LPF) 43, second LPF 44, first maximum value detector 45, second maximum value detector 46, differentiator 47, comparator 48, and flip-flop 49.

Figure 4:
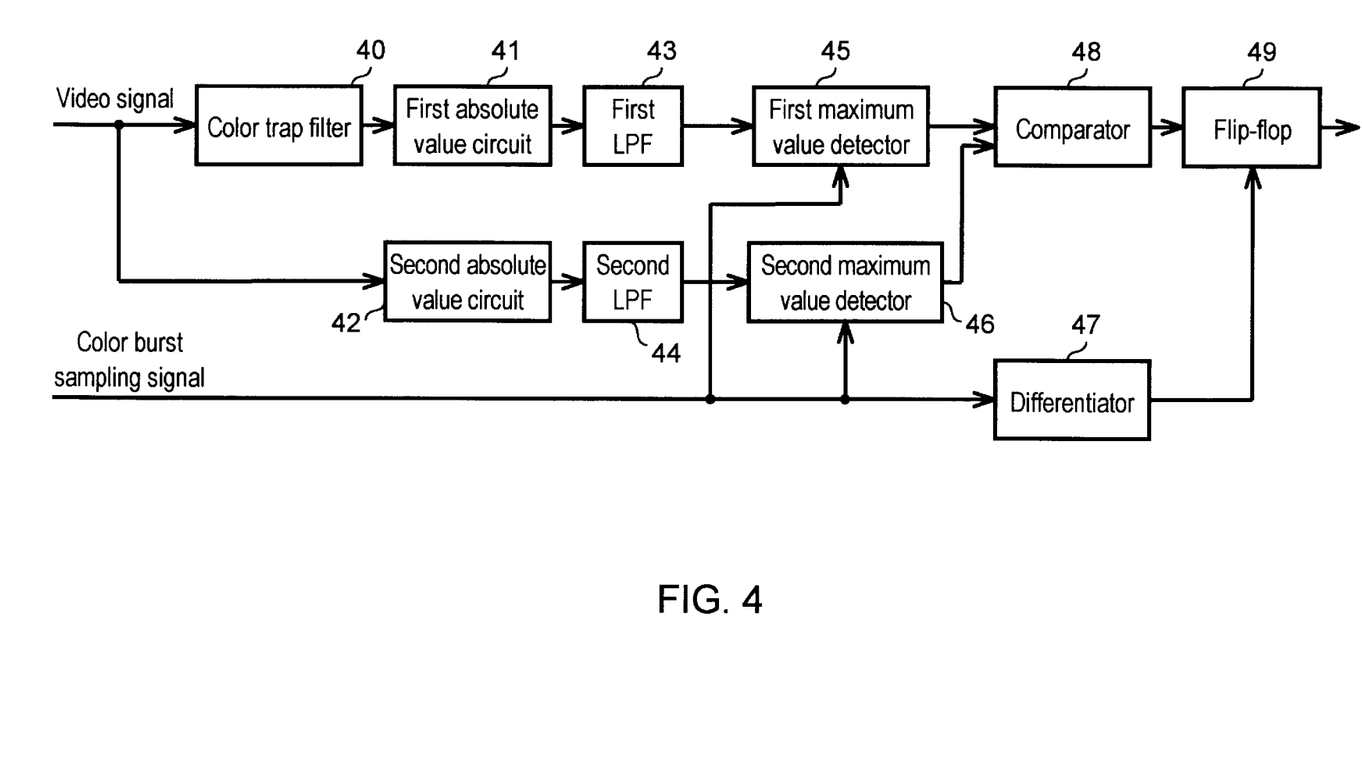
FIG. 4 is a block diagram of a color system determination circuit in accordance with a third exemplary embodiment of the present invention.

In FIG. 4, a video signal is input to the color trap filter 40 and the second absolute value detector 42. A color burst sampling signal (which indicates a period of the present position of the color burst signal as in the first and second exemplary embodiments) is input to the first maximum value detector 45, the second maximum value detector 46, and differentiator 47. The color trap filter 40 is a filter for trapping a subcarrier frequency of one broadcasting system to be received (in FIG. 2, 4.43 MHz). The characteristics of color trap filter 40 are shown in FIG. 2. The first absolute value circuit 41 receives the video signal which has passed through the color trap filter 40, and applies the absolute value processing to the filtered video signal. The second absolute value circuit 42 receives the video signal, and applies the absolute value processing to the video signal.

The first LPF 43 receives the output signal of the first absolute value circuit 41, and removes high-frequency noise components. The second LPF 44 receives the output signal of the second absolute value circuit, and removes high-frequency noise components. The first maximum value detector 45 receives the output signal of the first LPF 43 and the color burst sampling signal which indicates the position of the color burst signal. The first maximum value detector 45 detects the maximum value of the output signal of the first LPF 43 during a period indicated by the color burst sampling signal. The second maximum value detector 46 receives the output signal of the second LPF 44 and the color burst sampling signal. The second maximum value detector 46 detects the maximum value in the output signal of the second LPF 44 during a period indicated by the color burst sampling signal.

The differentiator 47 receives the color burst sampling signal, and detects the edge which indicates the end of the color burst sampling signal, and outputs the edge signal. The comparator 48 receives the output signals of the first maximum value detector 45 and the second maximum value detector 46, compares both signals, and outputs a comparison result. The flip-flop 49 receives the output signal of the comparator 48 and the edge signal, stores the output of the comparator 48 using the edge signal as a trigger, and outputs the determination result.

If the PAL video signal is input, the amplitude of the color burst signal at the output of the color trap filter 40 is attenuated. Accordingly, there will be a large difference in the amplitude of the input color burst signal and the color burst signal output from the color trap filter 40. Thus, the difference between the outputs of the first absolute value circuit 41 and the second absolute value circuit 42 becomes larger. The output signals of the first absolute value circuit 41 and the second absolute value circuit 42 are respectively applied to the first maximum value detector 45 and the second maximum value detector 46 after their respective high-frequency components are removed by the first LPF 43 and the second LPF 44.

Accordingly, there are large differences between the outputs of the first maximum value detector 45 and the second maximum value detector 46 during the color burst period indicated by the color burst sampling signal. In other words, the output of the second maximum value detector 46 becomes larger, and the comparator 46 outputs a comparison result indicating a PAL system signal, for example HI. The flip-flop 49 is triggered by the edge signal which indicates the end of the color burst period, to sustain the above comparison result, and outputs the above comparison result, which is a color system determination result.

If the NTSC video signal is input, the amplitude of the color burst signal output from the color trap filter 40 is not attenuated. Accordingly, there is no difference in the amplitudes of the input color burst signal and the color burst signal output from the color trap filter 40. Therefore, the outputs of the first absolute value circuit 41 and the second absolute value circuit 42 are essentially equivalent. The output signals of the first absolute value circuit 41 and the second absolute value circuit 42 are respectively applied to the first maximum value detector 45 and the second maximum value detector 46 after the high-frequency component in each signal is respectively removed by the first LPF 43 and the second LPF 44. The outputs of the first LPF 43 and the second LPF 44 are essentially equivalent and, thus, the outputs of the first maximum value detector 45 and the second maximum value detector 46 during the color burst period indicated by the color burst sampling signal, becomes essentially equivalent. The comparator 48 then outputs a comparison result indicating an NTSC system signal, for example LOW.

The color system determination circuit of this exemplary embodiment operates rapidly, and outputs the determination result at high speed.

Fourth exemplary embodiment

A fourth exemplary embodiment of the present invention is explained with reference to FIGS. 2 and 5.

A color system determination circuit in a fourth exemplary embodiment comprises a color trap filter 50, first absolute value circuit 51, second absolute value circuit 52, first integrator 53, second integrator 54, differentiator 55, comparator 56, and flip-flop 57.

Figure 5:
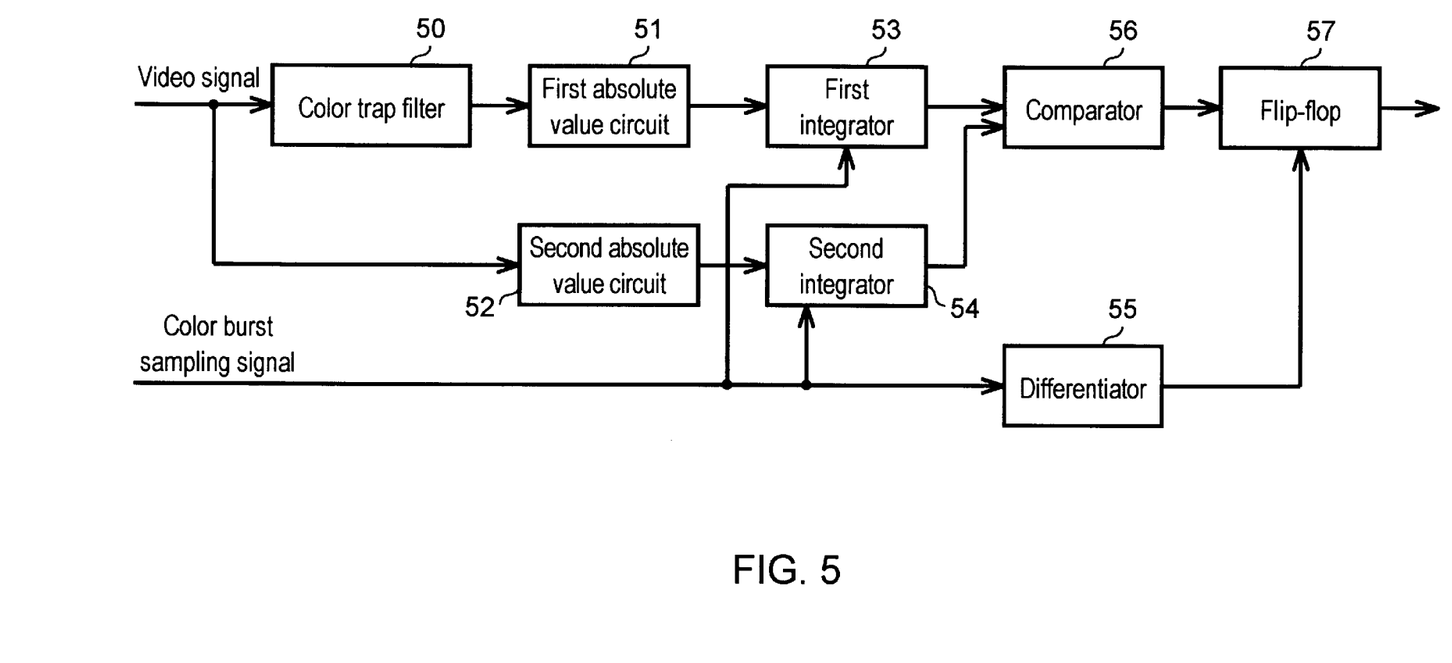
FIG. 5 is a block diagram of a color system determination circuit in accordance with a fourth exemplary embodiment of the present invention.

In FIG. 5, the color trap filter 50 has the characteristics as shown in FIG. 2. The first absolute value circuit 51 receives the video signal which has passed through the color trap filter 50, and applies the absolute value processing to the filtered video signal. The second absolute value circuit 52 receives the video signal, and applies the absolute value processing to the video signal. The first integrator 53 receives the output signal of the first absolute value circuit 51 and the color burst sampling signal, which indicates the position of the color burst signal, and integrates the output signal of the first absolute value circuit 51 during a period indicated by the color burst sampling signal. The second integrator 54 receives the output signal of the second absolute value circuit 52 and the color burst sampling signal, and integrates the output signal of the second absolute value circuit 52 during a period indicated by the color burst sampling signal. The differentiator 55 receives the color burst sampling signal, detects the edge which indicates the end of the color burst sampling signal, and outputs the edge signal. The comparator 56 receives the output signals of the first integrator 53 and the second integrator 54, compares the size of both signals, and outputs a comparison result. The flip-flop 57 receives the output signal of the comparator 56 and the edge signal, stores the output of the comparator 56 using the edge signal as a trigger, and outputs the determination result.

If the PAL video signal is input, the amplitude of the output signal of the color trap filter 50 is attenuated. Accordingly, there will be a difference in the amplitude of the input color burst signal and the color burst signal output from the color trap filter 50. The difference between the outputs of the first absolute value circuit 51 and the second absolute value circuit 52 also increases and, thus, the difference in the outputs of the first integrator 53 and the second integrator 54 during the color burst period indicated by the color burst sampling signal increases. Specifically, the output signal of the second integrator 54 increases. The comparator 56 then outputs the comparison result indicating a PAL system signal, for example HI. The flip-flop 57 is triggered by the edge signal which indicates the end of the color burst period, to sustain the above comparison result and outputs the above comparison result, which is a color system determination result.

If the NTSC video signal is input, the amplitude of the output signal of the color trap filter 50 is not attenuated. Accordingly, there is little difference in the amplitudes of the color burst signal in the input video signal and the color burst signal output from the color trap filter 50. The outputs of the first absolute value circuit 51 and the second absolute value circuit 52 also become essentially equivalent. Therefore, the outputs of the first integrator 53 and the second integrator 54 during the color burst period indicated by the color burst sampling signal are also essentially equivalent, and the comparator 56 outputs a comparison result indicating an NTSC system signal, for example LOW.

The color system determination circuit of this exemplary embodiment operates rapidly, and outputs the determination result at high speed.

Fifth exemplary embodiment

A fifth exemplary embodiment of the present invention is explained with reference to FIGS. 6 and 8.

A color system determination circuit in the fifth exemplary embodiment of the present invention comprises a color trap filter 60, first absolute value circuit 61, second absolute value circuit 62, first integrator 63, second integrator 64, subtractor 65, differentiator 66, comparator 67, and flip-flop 68.

Figure 6:
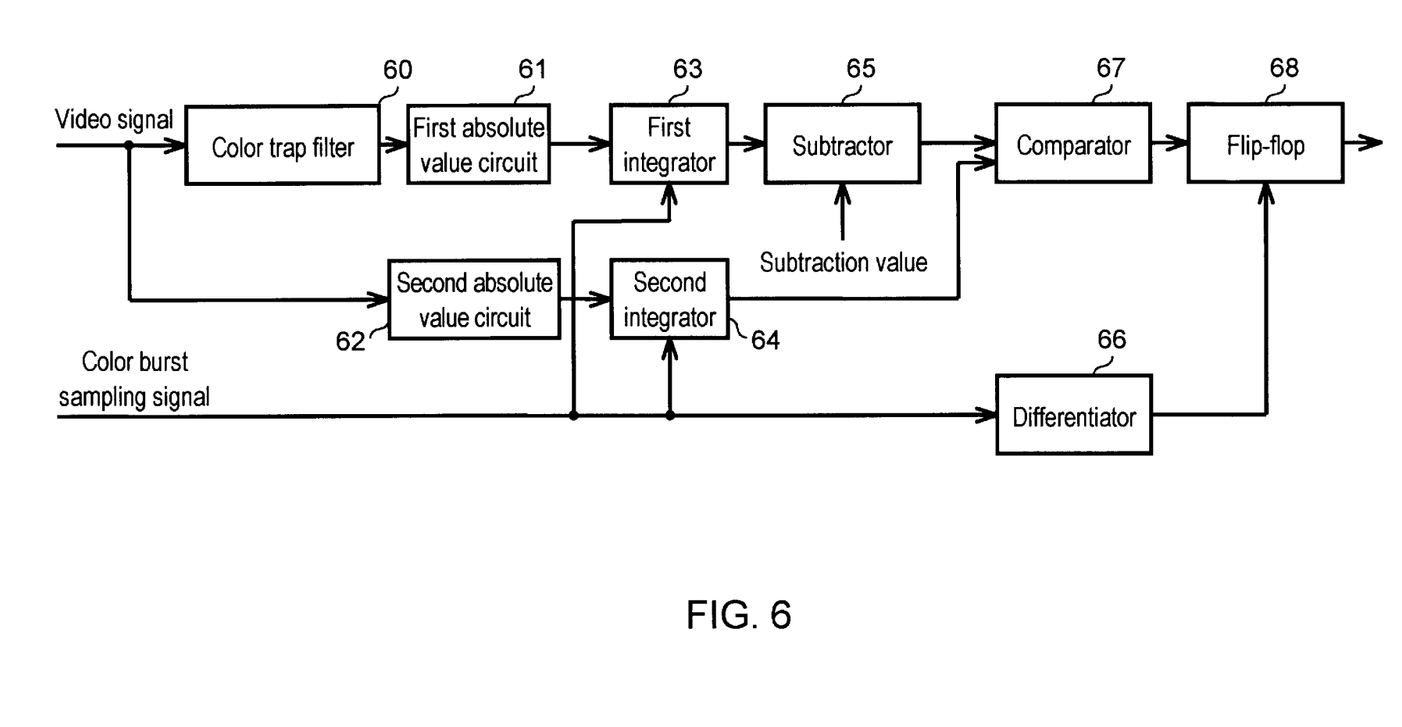
FIG. 6 is a block diagram of a color system determination circuit in accordance with a fifth exemplary embodiment of the present invention.
Figure 8:
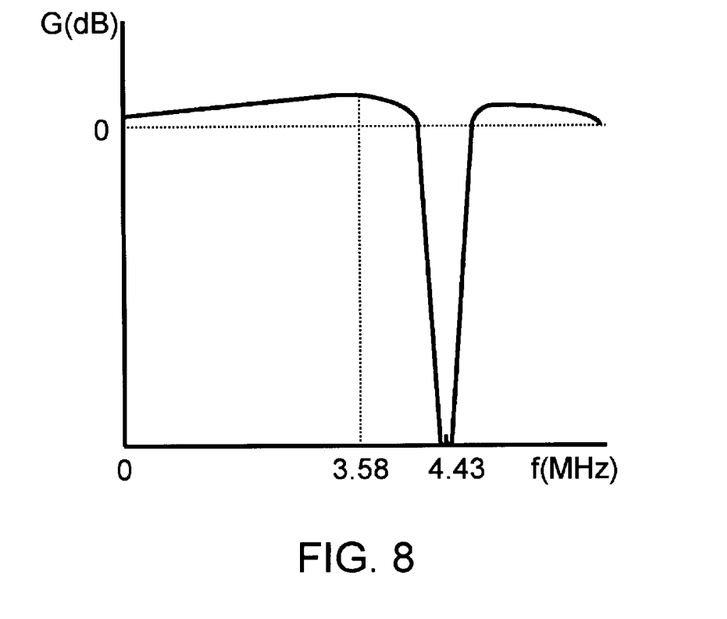
FIG. 8 is a graph showing characteristics of a color trap filter in accordance with the fifth and seventh exemplary embodiments.

In FIG. 6, the color trap filter 60 has the characteristics shown in FIG. 8. The first absolute value circuit 61 receives a video signal which has passed through the color trap filter 60, and applies the absolute value processing to the filtered video signal. The second absolute value circuit 62 receives the video signal, and applies the absolute value processing to the video signal. The first integrator 63 receives the output signal of the absolute value circuit 61 and the color burst sampling signal which indicates the position of the color burst signal, and integrates the output signal of the first absolute value circuit 61 during a period indicated by the color burst sampling signal. The second integrator 64 receives the output signal of the second absolute value circuit 62 and the color burst sampling signal, and integrates the output of the second absolute value circuit 62 during a period indicated by the color burst sampling signal. The subtractor 65 receives the output of the first integrator 63 and a subtraction value, and subtracts the subtraction value from the output of the first integrator 63. The differentiator 66 receives the color burst sampling signal, detects the edge which indicates the end of the color burst sampling signal, and outputs the edge signal. The comparator 67 receives the output signals of the subtractor 65 and the second integrator 64, compares the size of both signals, and outputs a comparison result. The flip-flop 68 receives the output signal of the comparator 67 and the edge signal, and stores the output of the comparator 67 using the edge signal as a trigger.

FIG. 8 shows the characteristics of the color trap filter 60. The color trap filter 60 in FIG. 8 has the characteristics for attenuating a frequency component of the PAL subcarrier frequency, i.e., 4.43 MHz, and amplifying a frequency component around the NTSC subcarrier frequency, i.e. 3.58 MHz.

If the PAL video signal is input, the amplitude of the output signal of the color trap filter 60 is attenuated. Accordingly, there will be a difference in the amplitude of the input video signal and the output signal of the color trap filter 60. The difference between the outputs of the first absolute value circuit 61 and the second absolute value circuit 62 also increases. Therefore, the difference between the outputs of the first integrator 63 and the second integrator 64 during the color burst period indicated by the color burst sampling signal also increases. Specifically, the output of the second integrator 64 becomes large, and the output of the first integrator 63 becomes even smaller by operation of subtractor 65. The comparator 67 thus outputs a comparison result indicating a PAL system signal, for example HI. The flip-flop 68 is triggered by the edge signal which indicates the end of the color burst period, to sustain the above comparison result and outputs the above comparison result, which is a color system determination result.

If the NTSC video signal is input, the amplitude of the color burst signal output from the color trap filter 60 is amplified. Accordingly, the output of the first absolute value circuit 61 becomes larger than the output of the second absolute value circuit 62. The output of the first integrator 63 also becomes larger than the output of the second integrator 64 during the color burst period indicated by the color burst sampling signal. The subtractor 65 further subtracts the subtraction value from the output of the first integrator 63. The subtraction value is set to make the subtraction result not smaller than the output of the second integrator 64. Thus, the comparator 67 detects that the output of the subtractor 65 is larger than the output of the second integrator 64, and outputs a comparison result for the NTSC system, for example LOW.

The color system determination circuit of this exemplary embodiment operates rapidly, and outputs the determination result at extremely high speed.

Sixth exemplary embodiment

A sixth exemplary embodiment of the present invention is explained with reference to FIGS. 1, 3, 4, 5, and 7.

Figure 7:
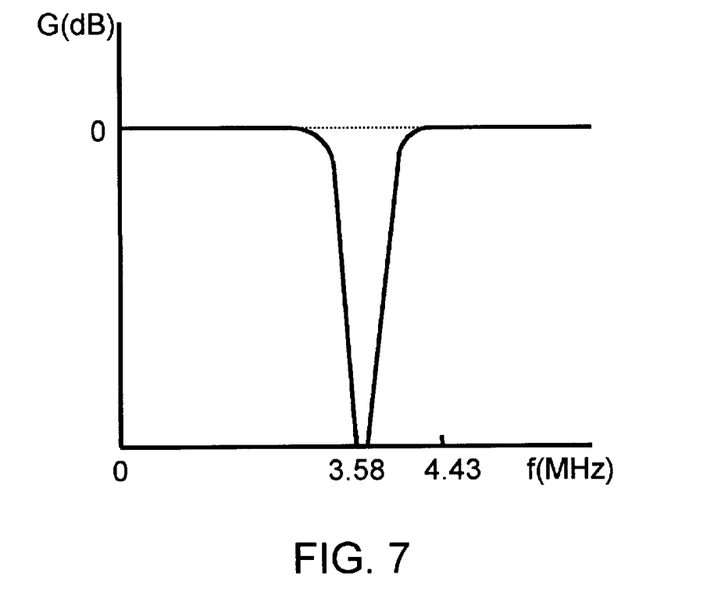
FIG. 7 is a graph showing characteristics of a color trap filter in a sixth exemplary embodiment of the present invention.

In this exemplary embodiment, the characteristics of the color trap filters 10, 30, 40, and 50 in the first, second, third, and fourth exemplary embodiments, shown in FIGS. 1, 3, 4, and 5 are set to attenuate the NTSC subcarrier frequency, i.e. 3.58 MHz, as shown in FIG. 7.

With the above setting, the signals which have passed through and those which have not passed through the color trap filters 10, 30, 40, and 50, and then input to the comparators 14, 36, 48, and 56 become essentially equivalent to those which have not passed these color trap filters if the PAL video signal is input.

If the NTSC video signal is input, the signals which have passed through color trap filters 10, 30, 40, and 50 become smaller than those which have not passed through, and then input to the comparators 14, 36, 48, and 56.

The comparators 14, 36, 48, and 56 determine the video signal to be a PAL signal if the input signals are essentially equivalent, and determine the video signal to be an NTSC signal if the signals which have passed through the color trap filters 10, 30, 40, and 50 are smaller.

The color system determination circuit of this exemplary embodiment operates rapidly, and outputs the determination result at high speed.

Seventh exemplary embodiment

A seventh exemplary embodiment of the present invention is explained with reference to FIGS. 1, 3, 4, 5, and 8.

In this exemplary embodiment, the characteristics of the color trap filters 10, 30, 40, and 50 in the first, second, third, and fourth exemplary embodiments, shown in FIGS. 1, 3, 4, and 5, respectively, are set to attenuate the frequency component around 4.43 MHz and amplify the frequency component around 3.58 MHz as shown in FIG. 8.

With this setting, signals which have passed through the color trap filters 10, 30, 40, and 50, and then input to the comparators 14, 36, 48, and 56 become smaller than signals which have not passed through these color trap filters if the PAL video signal is input.

If the NTSC video signal is input, the signals which have passed through the color trap filters 10, 30, 40, and 50, and then input to the comparators 14, 36, 48, and 56 are amplified and become larger than those which have not passed through these color trap filters.

Comparators 14, 36, 48, and 56 then determine that the input signal is the NTSC signal if the signals which have passed through the color trap filter 10, 30, 40, and 50 are larger, and determines that the input signal is the PAL signal if the signals which have passed through the color trap filters 10, 30, 40, and 50 are smaller.

Allowance for judgment criteria for the NTSC signal is broadened and, thus, detection accuracy can be improved by setting the characteristics of the color trap filters 10, 30, 40, and 50 to attenuate the frequency component around 4.43 MHz and amplify the frequency component around 3.58 MHz.

The color system determination circuit of this exemplary embodiment operates rapidly, and outputs the determination result at high speed.

Eighth exemplary embodiment

An eighth exemplary embodiment of the present invention is explained with reference to FIGS. 1, 3, 4, 5, 6, and 9.

Figure 9:
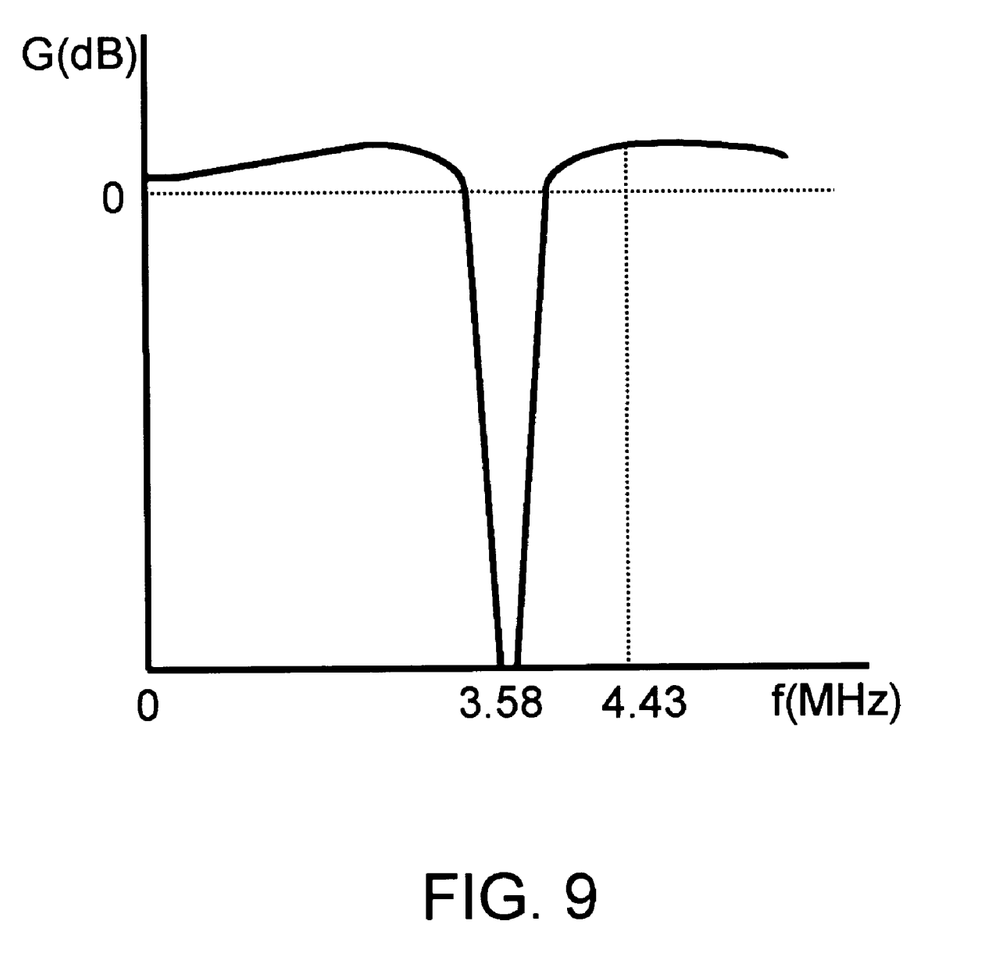
FIG. 9 is a graph showing characteristics of a color trap filter in an eighth exemplary embodiment of the present invention.

In this exemplary embodiment, the characteristics of the color trap filters 10, 30, 40, 50, 60 shown in FIGS. 1, 3, 4, 5, and 6, respectively, are set to attenuate the frequency component around 3.58 MHz and amplify the frequency component around 4.43 MHz as shown in FIG. 9.

With this setting, signals which have passed through the color trap filters 10, 30, 40, and 50, and then input to the comparators 14, 36, 48, 56, and 67 become larger than signals which have not passed through these color trap filters if the PAL video signal is input, same as in the first, second, third, and fourth exemplary embodiments.

If the NTSC video signal is input, the signals which have passed through the color trap filters 10, 30, 40, 50, and 60, and then input to the comparators 14, 36, 48, 56, and 67 are amplified and become smaller than those which have not passed through these color trap filters.

Comparators 14, 36, 48, 56, and 67 then determine that the input signal is the PAL signal if the signals which have passed through the color trap filter 10, 30, 40, 50 and 60 are larger, and determine that the input signal is the NTSC signal if the above signals which have passed through the color trap filters 10, 30, 40, 50, and 60 are smaller.

A judgment criteria for the PAL signal is broadened and thus detection accuracy can be improved by setting the characteristics of the color trap filters 10, 30, 40, 50, and 60 to attenuate the frequency component around 3.58 MHz and amplify the frequency component around 4.43 MHz.

The color system determination circuit of this exemplary embodiment operates rapidly, and outputs the determination result at high speed.

The above first to eighth exemplary embodiments explain the color system determination circuit of the present invention for determining the difference in the subcarrier frequency of the input signal when there is two possible types of broadcasting systems to be received. If there are three possible types of broadcasting systems having a different subcarrier frequency in the input signal, the trapping frequency of the color trap circuit used is set to one of the subcarrier frequencies of three types of the input signals. This provides the ability to determine at least whether the receiving broadcast signal is one type of color system or not.

In the above explanation, the flip-flop is employed, as an example, for sustaining the comparison result of the comparator using the edge signal which indicates the end of the color burst period, and outputs the color system determination result. It is apparent that other methods are applicable for outputting the color system determination result. The preferred embodiments described herein are therefore illustrative and not restrictive. The scope of the invention being indicated by the appended claims and all modifications which come within the true spirit of the claims are intended to be embraced therein.

What is claimed is:

1. A color system determination circuit for use with an input video signal having a frequency component, said circuit comprising:

a color trap filter for attenuating the frequency component in the input video signal, said color trap filter providing a color burst output signal;

a comparator for comparing the color burst output signal of said color trap filter and said frequency component of the input video signal;

a first maximum value detector which receives the color burst output signal of said color trap filter and a color burst sampling signal, and detects a maximum value of the color burst output signal of said color trap filter during a period of the color burst sampling signal; and a second maximum value detector which receives said video signal and said color burst sampling signal, and detects a maximum value of said video signal during the period of said color burst sampling signal;

wherein said comparator receives output signals of said first maximum value detector and said second maximum value detector, compares both signals, and outputs a comparison result.

2. The color system determination circuit according to claim 1, further comprising:

a differentiator which receives said color bust sampling signal, detects an edge corresponding to an end of said color burst sampling signal, and outputs an edge signal; and a flip-flop which receives the comparison result of said comparator and said edge signal, and stores the comparison result of said comparator using said edge signal as a trigger.

3. A color system determination circuit for use with an input video signal having a frequency component, said circuit comprising:

a color trap filter for attenuating the frequency component in the input video signal, said color trap filter providing a color burst output signal;

a comparator for comparing the color burst output signal of said color trap filter and said frequency component of the input video signal;

a first absolute value circuit which receives the color burst output signal of said color trap filter, and applies a first absolute value processing to said color burst output signal;

a second absolute value circuit which receives said input video signal and applies a second absolute value processing to said input video signal;

a first maximum value detector which receives an output signal of said first absolute value circuit and said color burst sampling signal, and detects a maximum value of the output signal of said first absolute value circuit during a period corresponding to the color burst sampling signal; and a second maximum value detector which receives an output signal of said second absolute value circuit and said color burst sampling signal, and detects the maximum value of the output of said second absolute value circuit during the period corresponding to the color burst sampling signal;

wherein said comparator receives output signals of said first maximum value detector and said second maximum value detector, compares both signals, and outputs a comparison result.

4. The color system determination circuit according to claim 3, further comprising:

a differentiator which receives said color burst sampling signal, detects an edge corresponding to an end of said color burst sampling signal, and outputs an edge signal; and a flip-flop which receives the comparison result of said comparator and said edge signal, and stores the comparison result of said comparator using said edge signal as a trigger.

5. A color system determination circuit for use with an input video signal having a frequency component, said circuit comprising:

a color trap filter for attenuating the frequency component in the input video signal, said color trap filter providing a color burst output signal;

a comparator for comparing the color burst output signal of said color trap filter and said frequency component of the input video signal;

a first absolute value circuit which receives the said input video signal which has passed through said color trap filter, and applies a first absolute value processing to said filtered video signal;

a second absolute value circuit which receives said input video signal and applies a second absolute value processing to said input video signal;

a first LPF which receives an output signal of said first absolute value circuit and removes a high-frequency component from said output signal of said first absolute value circuit;

a second LPF which receives an output signal of said second absolute value circuit, and removes a high-frequency component from said output signal of said second absolute value circuit;

a first maximum value detector which receives an output signal of said first LPF and a color burst sampling signal, and detects a maximum value of the output signal of said first LPF during a period corresponding to the color burst sampling signal; and a second maximum value detector which receives an output signal of said second LPF and said color burst sampling signal, and detects a maximum value of the output signal of said second LPF during the period corresponding to said color burst sampling signal;

wherein said comparator receives output signals of said first maximum value detector and second maximum value detector, compares both signals, and outputs a comparison result.

6. The color system determination circuit according to claim 5, further comprising:

a differentiator which receives said color burst sampling signal, detects an edge corresponding to an end of said color burst sampling signal, and outputs an edge signal; and a flip-flop which receives the comparison result of said comparator and said edge signal, and stores the comparison result of said comparator using said edge signal as a trigger.

7. A color system determination circuit for use with an input video signal having a frequency component, said circuit comprising:

a color trap filter for attenuating the frequency component in the input video signal, said color trap filter providing a color burst output signal;

a comparator for comparing the color burst output signal of said color trap filter and said frequency component of the input video signal;

a first absolute value circuit which receives said input video signal which has passed through said color trap filter, and applies a first absolute value processing to said filtered input video signal;

a second absolute value circuit which receives said video signal and applies a second absolute value processing to said input video signal;

a first integrator which receives an output signal of said first absolute value circuit and a color burst sampling signal, and integrates the output signal of said first absolute value circuit during a period corresponding to said color burst sampling signal; and a second integrator for integrating an output signal of said second absolute value circuit during the period corresponding to said color burst sampling signal; and wherein said comparator receives output signals of said first integrator and said second integrator, compares both signals, and outputs a comparison result.

8. The color system determination circuit according to claim 7, further comprising:

a differentiator which receives said color burst sampling signal, detects an edge corresponding to an end of said color burst sampling signal, and outputs an edge signal; and a flip-flop which receives the comparison result of said comparator and said edge signal, and stores the comparison result of said comparator using said edge signal as a trigger.

9. A color system determination circuit for use with an input video signal having a frequency component, said circuit comprising:

a color trap filter for attenuating the frequency component of the input video signal, and amplifying said input video signal around said frequency;

a first absolute value circuit which receives said input video signal which has passed through said color trap filter, and applies a first absolute value processing to said filtered input video signal;

a second absolute value circuit which receives said video signal and applies a second absolute value processing to said input video signal;

a first integrator which receives an output signal of said first absolute value circuit and a color burst sampling signal, and integrates the output signal of said first absolute value circuit during a period corresponding to said color burst sampling signal;

a second integrator for integrating an output signal of said second absolute value circuit during the period corresponding to said color burst sampling signal;

a subtractor which receives an output signal of said first integrator and a subtraction value, and subtracts the subtraction value from the output signal of said first integrator; and a comparator which receives output signals of said subtractor and said second integrator, compares both signals, and outputs a comparison result.

10. The color system determination circuit according to claim 9, further comprising:
- a differentiator which receives said color burst sampling signal, detects an edge corresponding to an end of said color burst sampling signal, and outputs an edge signal; and
- a flip-flop which receives the comparison result of said comparator and said edge signal, and stores the comparison result of said comparator using said edge signal as a trigger.

11. The color system determination circuit according to claim 1, wherein said color trap filter attenuates the input video signal at a frequency around 4.43 MHz.

12. The color system determination circuit according to claim 3, wherein said color trap filter attenuates the input video signal at a frequency around 4.43 MHz.

13. The color system determination circuit according to claim 5, wherein said color trap filter attenuates the input video signal at a frequency around 4.43 MHz.

14. The color system determination circuit according to claim 7, wherein said color trap filter attenuates the input video signal at a frequency around 4.43 MHz.

15. The color system determination circuit according to claim 1, wherein said color trap filter attenuates the input video signal at a frequency around 3.58 MHz.

16. The color system determination circuit according to claim 3, wherein said color trap filter attenuates the input video signal at a frequency around 3.58 MHz.

17. The color system determination circuit according to claim 5, wherein said color trap filter attenuates the input video signal at a frequency around 3.58 MHz.

18. The color system determination circuit according to claim 7, wherein said color trap filter attenuates the input video signal at a frequency around 3.58 MHz.

19. The color system determination circuit according to claim 1, wherein said color trap filter attenuates the input video signal at a frequency around 4.43 MHz and amplifies the input video signal at a frequency around 3.58 MHz.

20. The color system determination circuit according to claim 3, wherein said color trap filter attenuates the input video signal at a frequency around 4.43 MHz and amplifies the input video signal at a frequency around 3.58 MHz.

21. The color system determination circuit according to claim 5, wherein said color trap filter attenuates the input video signal at a frequency around 4.43 MHz and amplifies the input video signal at a frequency around 3.58 MHz.

22. The color system determination circuit according to claim 7, wherein said color trap filter attenuates the input video signal at a frequency around 4.43 MHz and amplifies the input video signal at a frequency around 3.58 MHz.

23. The color system determination circuit according to claim 1, wherein said color trap filter attenuates the input video signal at a frequency around 3.58 MHz, and amplifies the input video signal at a frequency around 4.43 MHz.

24. The color system determination circuit according to claim 3, wherein said color trap filter attenuates the input video signal at a frequency around 3.58 MHz, and amplifies the input video signal at a frequency around 4.43 MHz.

25. The color system determination circuit according to claim 5, wherein said color trap filter attenuates the input video signal at a frequency around 3.58 MHz, and amplifies the input video signal at a frequency around 4.43 MHz.

26. The color system determination circuit according to claim 7, wherein said color trap filter attenuates the input video signal at a frequency around 3.58 MHz, and amplifies the input video signal at a frequency around 4.43 MHz.

27. The color system determination circuit according to claim 9, wherein said color trap filter attenuates the input video signal at a frequency around 3.58 MHz, and amplifies the input video signal at a frequency around 4.43 MHz.

* * * * *

UNITED STATES PATENT AND TRADEMARK OFFICE
CERTIFICATE OF CORRECTION

PATENT NO. : 6,172,713 B1　　　　　　　　　　　　　　　　　　　　　　Page 1 of 1
DATED : January 9, 2001
INVENTOR(S) : Morita It is certified that error appears in the above-identified patent and that said Letters Patent is hereby corrected as shown below:

<u>Title page,</u>
Item [56], References Cited, FOREIGN PATENT DOCUMENTS, delete reference "358025789 * 2/1983 (JP)".

<u>Column 10, claim 2,</u>
Line 35, after "color" delete "bust" and insert -- burst --.

Signed and Sealed this

Fourth Day of December, 2001

Attest:

*Nicholas P. Godici*

NICHOLAS P. GODICI
*Attesting Officer*　　*Acting Director of the United States Patent and Trademark Office*